United States Patent
Hawawini et al.

(10) Patent No.: US 9,203,309 B2
(45) Date of Patent: Dec. 1, 2015

(54) MULTI-OUTPUT BOOST REGULATOR WITH SINGLE CONTROL LOOP

(71) Applicant: QUALCOMM Incorporated, San Diego, CA (US)

(72) Inventors: Shadi Hawawini, San Jose, CA (US); Giovanni Garcea, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 267 days.

(21) Appl. No.: 14/024,383

(22) Filed: Sep. 11, 2013

(65) Prior Publication Data
US 2015/0069983 A1    Mar. 12, 2015

(51) Int. Cl.
*H02M 3/158* (2006.01)
*H02M 1/00* (2007.01)

(52) U.S. Cl.
CPC ............ *H02M 3/158* (2013.01); *H02M 3/1582* (2013.01); *H02M 3/1588* (2013.01); *H02M 2001/009* (2013.01)

(58) Field of Classification Search
CPC ..................................................... H02M 3/158
See application file for complete search history.

(56) References Cited

U.S. PATENT DOCUMENTS

| | | | |
|---|---|---|---|
| 7,227,277 B2 * | 6/2007 | Chapman et al. ................ | 307/43 |
| 7,564,704 B2 | 7/2009 | Rozsypal et al. | |
| 7,852,060 B2 | 12/2010 | Omet et al. | |
| 8,427,113 B2 | 4/2013 | Xing et al. | |
| 2008/0238383 A1* | 10/2008 | Watanabe et al. .............. | 323/271 |
| 2009/0103341 A1* | 4/2009 | Lee et al. ....................... | 363/124 |
| 2010/0148587 A1 | 6/2010 | Khaligh | |
| 2010/0308654 A1 | 12/2010 | Chen | |
| 2012/0212987 A1 | 8/2012 | Weir et al. | |
| 2013/0003423 A1 | 1/2013 | Song et al. | |

OTHER PUBLICATIONS

Huang M.H., et al., "Single-Inductor Multi-Output (SIMO) DC-DC Converters with High Light-Load Efficiency and Minimized Cross-Regulation for Portable Devices," IEEE Journal of Solid-State Circuits, 2009, vol. 44 (4), pp. 1099-1111.
International Search Report and Written Opinion—PCT/US2014/055181—ISA/EPO—Dec. 2, 2014.

* cited by examiner

*Primary Examiner* — Emily P Pham
(74) *Attorney, Agent, or Firm* — Fountainhead Law Group P.C.

(57) ABSTRACT

A switching regulator circuit provides forward mode operation where a voltage provided at an input port can be boosted or bucked to produce a regulated voltage at an output port of the circuit. In accordance with the present disclosure, the switching regulator circuit includes two or more input ports. The switching regulator circuit provides a reverse boost operation in which a voltage provided at the output port of the circuit can be boosted to produce a regulated voltage at both of the input ports of the circuit.

20 Claims, 5 Drawing Sheets

MULTI-OUTPUT BOOST REGULATOR WITH SINGLE CONTROL LOOP

BACKGROUND

Unless otherwise indicated herein, the approaches described in this section are not prior art to the claims in this application and are not admitted to be prior art by inclusion in this section.

Modern electronic systems typically require some form of power conversion. The popularity of portable equipment (e.g., smartphones, portable computers, etc.) has driven the technology and the requirement for converting power efficiently. DC-DC converters called switching regulators (often referred to simply as "switchers") are especially suitable for use in portable electronic devices, and can either step-up (boost) or step-down (buck) DC electrical power.

Switching regulators used in portable electronic devices include a class of switching regulators called "buck-boost" switching regulators. The kind of buck-boost switchers used in portable electronic devices typically operate in forward buck mode and in reverse boost mode. In forward buck mode, a voltage at an input port is bucked to produce a regulated voltage at an output port. In reverse boost mode, a voltage at the output port is boosted to produce a regulated voltage at the input port.

SUMMARY

In some embodiments, a switching regulator circuit provides reverse boost mode operation in addition to forward buck mode operation. In reverse boost mode, the circuit converts a voltage at an output port (e.g., $V_{OUT}$) of the circuit to generate a regulated voltage at one or more input ports of the circuit. In accordance with the present disclosure, the circuit can drive multiple input ports with a regulated voltage level to provide multiple voltage rails at the input ports.

In some embodiments, the circuit may comprise at least two half-bridge circuits. During reverse boost mode operation, both of the half-bridge circuits can be switched to boost a voltage level provided at the output port of the circuit to produce a regulated output voltage at each of the input ports of the circuit.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
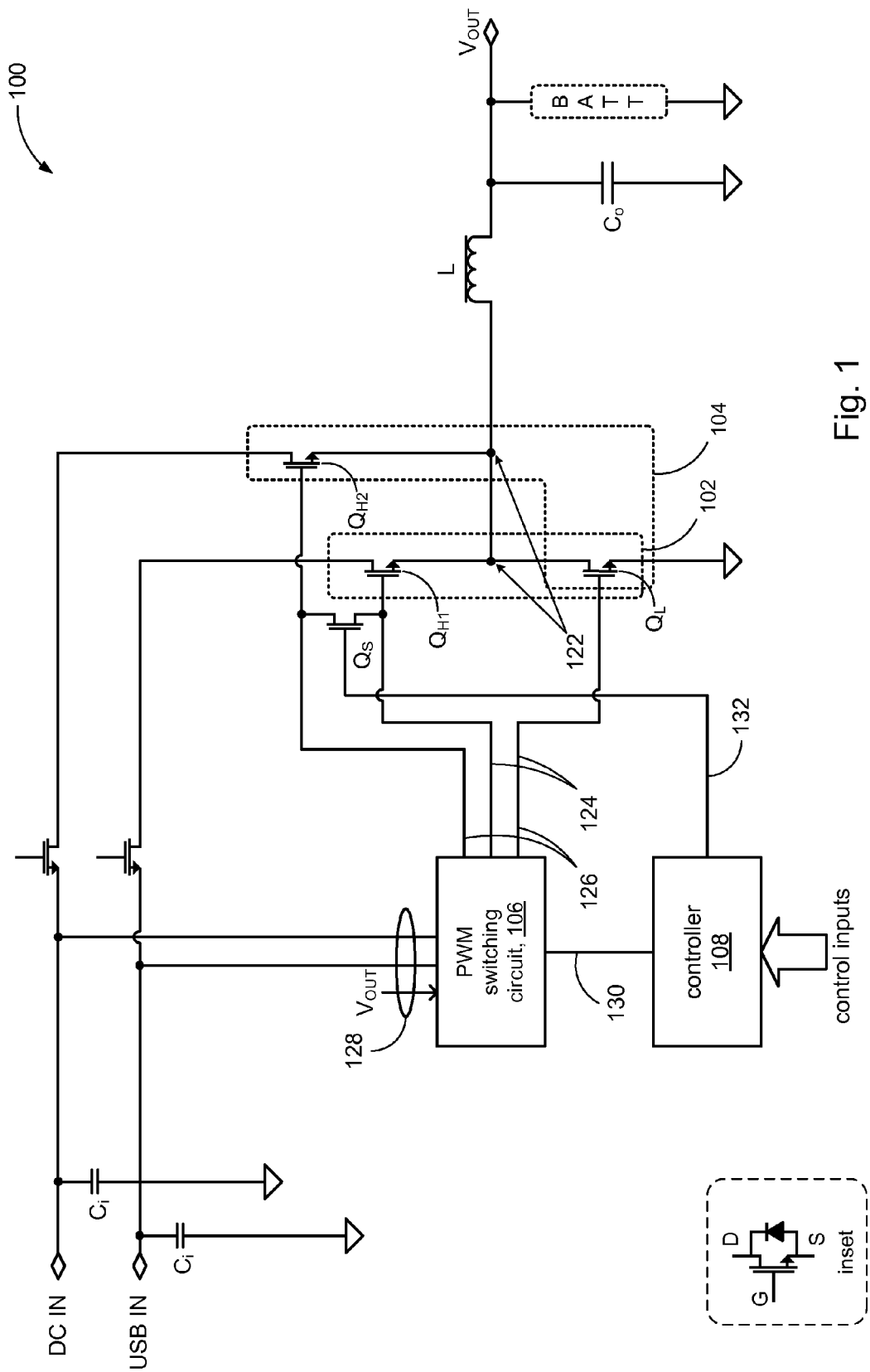
FIG. 1 shows a high level circuit diagram of a switching regulator in accordance with the present disclosure.

FIG. 1 shows a buck-boost switching regulator ("circuit") 100 in accordance with the present disclosure. One of ordinary skill will appreciate from the discussion to follow that the principles set forth herein can be incorporated in a boost-only switching regulator (not shown) as well, where the switching regulator can be operated in forward boost mode or in reverse boost mode.

In some embodiments, the circuit 100 illustrated in FIG. 1 may include several input ports. In an embodiment, for example, the input ports may include DC IN and USB IN. The USB IN port may be provided for connection to a USB compliant device. The DC IN port may be provided for connection to a power supply, or some other external device.

The circuit 100 may include half-bridge circuits 102 and 104, each being connected to an inductor L at a mid-point 122 between each half-bridge circuit 102, 104. In an embodiment, the USB IN port may feed into the half-bridge circuit 102, and the DC IN port may feed into the half-bridge circuit 104.

A system output $V_{OUT}$ may be obtained from the mid-point 122. In some embodiments, the circuit 100 may include a capacitor $C_O$ that is connected to system output $V_{OUT}$. The circuit 100 may be used in a portable electronic device (not shown) to provide power supplied at an input port USB IN or DC IN to system electronics comprising the portable electronic device via system output $V_{OUT}$. In a particular use case, the system electronics may be powered by a battery BATT and the battery is charged by the circuit 100.

The half-bridge circuit 102 may comprise a high side switch $Q_{H1}$ and a low side switch $Q_L$. The half-bridge circuit 104 similarly comprise a high side switch $Q_{H2}$ and low side switch $Q_L$. In some embodiments, such as shown in FIG. 1 for example, the half-bridge circuits 102, 104 may share the same low side switch, namely $Q_L$. In other embodiments, the half-bridge circuits 102, 104 may have their own respective low side switches (not shown). In some embodiments, the devices $Q_L$, $Q_{H1}$, and $Q_{H2}$ are power FETs.

The circuit 100 may include a PWM switching circuit 106 that can be operated to generate pulse-width modulated gate drive signals 124 to drive half-bridge circuit 102, or to generate gate drive signals 126 to drive half-bridge circuit 104. In particular, the drive signals 124, 126 drive the gates of power FETs $Q_L$, $Q_{H1}$, and $Q_{H2}$. The PWM switching circuit 106 may generate an internal error signal to control the duty cycles of the drive signals 124, 126. In some embodiments, feedback 128 may be provided from the system output $V_{OUT}$ or the input voltages at the DC IN and USB IN ports. In accordance with the present disclosure, the PWM switching circuit 106 may include a selector circuit to select system output $V_{OUT}$ as feedback 128 when operating in forward buck mode, and for reverse boost mode the selector circuit may select either the voltage at the USB IN port or the DC IN port as the feedback. The PWM switching circuit 106 may compare the selected feedback 128 against a reference voltage (e.g., a 5V reference, not shown) to generate the internal error signal. In some embodiments, the PWM switching circuit 106 may include several reference voltages to select from.

In accordance with the present disclosure, a shorting switch $Q_S$ may be connected across the gates of high side switch $Q_{H1}$ and high side switch $Q_{H2}$. In some embodiments, the shorting switch $Q_S$ may be a non-power switching FET.

A controller 108 may generate control signals 130 to control operation of the PWM switching circuit 106, for example, to operate in forward buck mode or reverse boost mode and to select a suitable feedback 128. In accordance with the present disclosure, the controller 108 may generate control signal 132 to operate the shorting switch $Q_S$ in the ON state or the OFF state. The control signals 130 and 132 may be generated according to control inputs that feed into the controller 108. In some embodiments, for example, the control inputs may be bits in a control register (not shown) that can be written to. It will be appreciated that the controller 108 may be implemented in any of several ways, including the use of digital logic circuits (e.g., application specific IC-ASIC), firmware, a combination of digital logic and firmware, and so on.

Forward buck mode operation and reverse boost mode operation will now be discussed. The circuit 100 may operate in "forward buck" mode, where an input voltage at USB IN or DCN IN is bucked to a lower voltage level and provided as a regulated voltage level at the system output $V_{OUT}$.

Figure 2B:
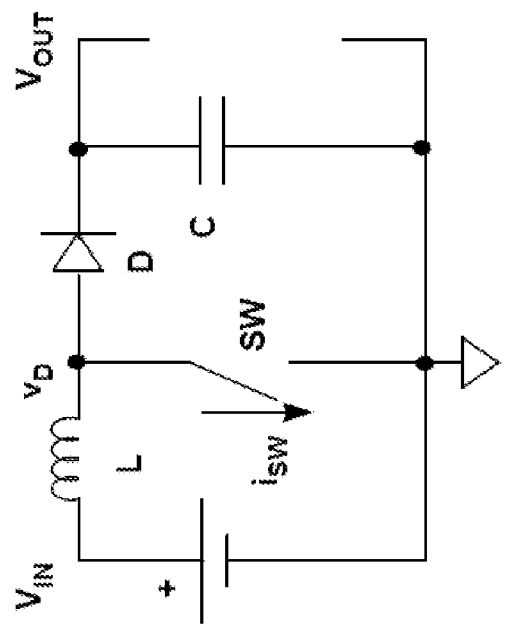
FIGS. 2A and 2B illustrate conventional buck converter and boost converter circuits, respectively.
Figure 2A:
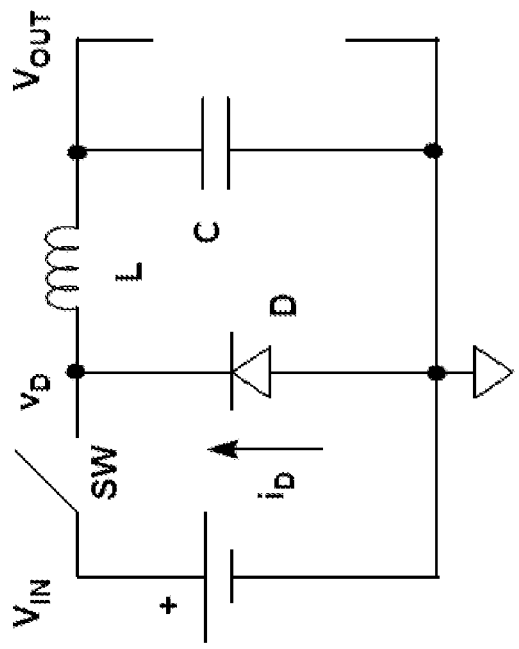

Consider, for example, buck mode operation on an input voltage provided at the DC IN port. The shorting switch $Q_S$ is in the OFF (non-conducting) state, and the PWM switching circuit 106 is operated to produce drive signals 126 to drive the high side and low side FETs $Q_{H2}$, and $Q_L$ (half-bridge 104) to operate as a buck regulator. Referring for a moment to FIG. 2A, the figure shows a conventional buck converter configuration. The input voltage $V_{IN}$ in FIG. 2A corresponds to the voltage at the DC IN port. The drive signals 126 may comprise pulse width modulated pulses that operate the power FETs $Q_{H2}$ and $Q_L$ so that $Q_{H2}$ is ON when $Q_L$ is OFF, and vice versa. One of skill in the art will recognize that the ON-OFF switching of the high side FET $Q_{H2}$ constitutes the switching element (SW) of the conventional buck converter shown in FIG. 2A. The low side FET $Q_L$ functions as the diode element (D) because it behaves as a forward conducting diode in the ON state and acts as a blocking diode in the OFF state by virtue of the device's body diode (see inset, FIG. 1). The system output $V_{OUT}$ corresponds to $V_{OUT}$ in FIG. 2A. The circuit 100 may be similarly operated for buck mode operation on an input voltage provided at the USB IN port.

The circuit 100 may operate in a conventional "reverse boost" mode, where a voltage level at the system output $V_{OUT}$ serves as the voltage that is boosted and provided at a higher regulated voltage level at one of the ports USB IN or DC IN. For example, in an on-the-go (OTG) operating mode, the battery BATT may serve as the power supply to provide power to a load (e.g., thumb drive) that is connected to the USB IN port.

Consider reverse boost mode operation on the USB IN port. The circuit 100 may be operated to boost a voltage provided at the system output $V_{OUT}$ (e.g., from battery BATT) to provide a regulated output voltage at the USB IN port. Accordingly, the PWM switching circuit 106 may be operated to produce drive signals 124 to drive the high side and low side FETs and $Q_L$ (half-bridge 102) to operate as a boost regulator. Referring for a moment to FIG. 2B, the figure shows a conventional boost converter configuration. In reverse boost mode operation, the voltage (e.g., from battery BATT) provided at system output $V_{OUT}$ corresponds to the input voltage $V_{IN}$ shown in FIG. 2B. The drive signals 126 may comprise pulse width modulated pulses that operate the power FETs $Q_{H1}$ and $Q_L$ so that $Q_{H1}$ is ON when $Q_L$ is OFF, and vice versa. One of skill will appreciate that the low side FET $Q_L$ constitutes the switching element (SW) of the conventional boost converter shown in FIG. 2B. The high side FET $Q_{H1}$ functions as the diode element (D) because it behaves as a forward conducting diode in the ON state and acts as a blocking diode in the OFF state by virtue of the device's body diode (see inset, FIG. 1). The PWM switching circuit 106 may use the output voltage generated at the USB IN port as feedback 128 to regulate the duty cycles of the drive signals 124. In reverse boost mode operation, the regulated output voltage produced at the USB IN port corresponds to $V_{OUT}$ in FIG. 2B.

It will be appreciated that drive signals 126 may be similarly produced to provide reverse boost mode operation on the DC IN port. In particular, the low side FET $Q_L$ constitutes the switching element SW and the high side FET $Q_{H2}$ functions as the diode element D shown in FIG. 2B to produce a regulated output voltage at the DC IN port.

In the foregoing description of reverse boost mode operation, the $Q_S$ shorting switch is assumed to be in the OFF (non-conducting) state. Accordingly, an output voltage is produced at only the USB IN port or the DC IN port, depending on whether the PWM switching circuit 106 generates drive signals 124 or drive signals 126. However, in accordance with the present disclosure, the circuit 100 may operate in reverse boost mode in which the shorting switch $Q_S$ is in the ON state. For example, in some embodiments the controller 108 may assert a voltage level on control signal 132 to turn ON the shorting switch $Q_S$.

When the shorting switch $Q_S$ is in the ON (conducting) state during reverse boost mode, it can be appreciated that driving either of the half-bridges 102 (or 104) will also drive the other half-bridge 104 (or 102). For example, if the PWM switching circuit 106 generates drive signals 124 to drive $Q_{H1}$ and $Q_L$ (half-bridge 102), then $Q_{H2}$ will also be driven by virtue of the short between the gates of $Q_{H1}$ and $Q_{H2}$ that is provided by the shorting switch $Q_S$. And since $Q_L$ is common to half-bridges 102 and 104, the result is that both half-bridges are driven by drive signals 124. In other words, reverse boost occurs on both the USB IN port and the DC IN port, and a regulated output voltage is generated at both the USB IN port and the DC IN port.

Similarly if the PWM switching circuit 106 generates drive signals 126 to drive $Q_{H2}$ and $Q_L$ (half-bridge 104) with the $Q_S$ shorting switch ON, then $Q_{H1}$ will also be driven by virtue of the short between the gates of $Q_{H1}$ and $Q_{H2}$ that is provided by the shorting switch. And since $Q_L$ is common to half-bridges 102 and 104, both half-bridges are driven by drive signals 126 with the result that regulated output voltages are generated at both the DC IN port and the USB IN port.

The controller 108 may generate suitable control signals 130, 132 to control the nature of the reverse boost operation performed by the circuit 100. For example, the control inputs (e.g., from a control register) may inform the controller 108 to configure circuit 100 for reverse boost operation to provide a regulated output voltage on a specified one of the input ports USB IN or DC IN. Accordingly, control signal 132 will be de-asserted to turn OFF the shorting switch Qs, and control signals 130 will be generated to control the PWM switching circuit 106 to generate drive signals 124 or 126 corresponding to the specified input port.

In accordance with the present disclosure, the control inputs may inform the controller 108 enable reverse boost operation on both input ports USB IN and DC IN to provide a regulated output voltage on both ports. Accordingly, control signal 132 will be asserted to turn ON the shorting switch $Q_S$. Since the gates of the high side FETs of each half-bridge are shorted together by the shorting switch $Q_S$, the PWM switching circuit 106 may assert either drive signals 124 or drive signals 126.

In accordance with the present disclosure, the control inputs may specify which input port has "priority" when reverse boost operation is enabled for both ports. The priority port refers to the port (e.g., USB IN or DC IN) whose output voltage will be regulated; e.g., by using the output voltage on the priority port as feedback 128 that the PWM switching circuit 106 will use to generate drive signals 124 or 126. The output voltage at the non-priority port will therefore be regulated according to the voltage on the priority port. In a particular implementation, for example, the PWM switching circuit 106 may include a selector to select a voltage on the USB IN port or the DC IN port as the feedback 128 to be compared against a reference voltage.

In accordance with the present disclosure, the operating mode of the circuit 100 can change dynamically by altering the control inputs. For example, suppose the circuit 100 is operating to provide reverse boost mode on the USB IN port only (i.e., a regulated output voltage is provided only to the USB IN port). The control inputs can be subsequently changed to configure the circuit 100 to enable reverse boost on both the USB IN and the DC IN ports; e.g., by the controller 108 asserting the control signal 132 to turn ON the shorting switch $Q_S$. Furthermore, the control inputs may identify the priority port to cause the controller 108 to generate suitable control signals 130 to the PWM switching circuit 106 to select the appropriate feedback 128; i.e., either the voltage on USB IN or the voltage on DC IN.

Conversely, suppose the circuit 100 is operating to provide reverse boost mode on both the USB IN and DC IN ports. The control inputs can be subsequently changed to configure the circuit 100 to enable reverse boost on only one of the input ports. In response, the controller 108 may de-assert control signal 132 to turn OFF the shorting switch $Q_S$ and assert control signals 130 to control the PWM switching circuit 106 to generate drive signals (124 or 126) to drive only the half-bridge corresponding to the specified input port, including selecting the proper feedback 128.

Figure 3:
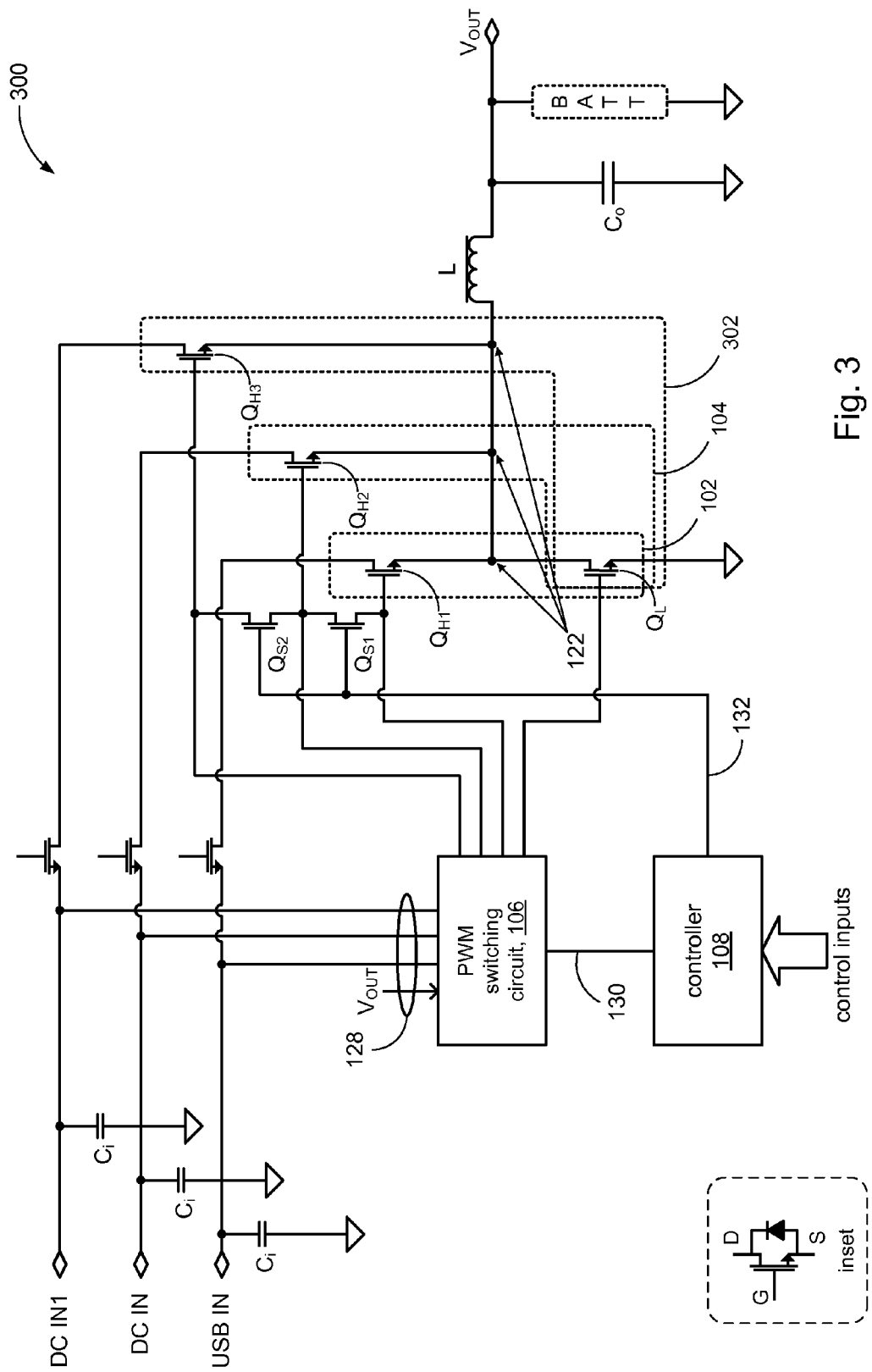
FIG. 3 illustrates an embodiment in accordance with the present disclosure having an additional input port.

In some embodiments, the circuit 100 may include additional input ports. Referring to FIG. 3, a circuit 300 includes an additional input port DC IN1. It will be appreciated that, in other embodiments, the number of additional input ports can be readily scaled to provide the circuit 300 with more than three input ports. The circuit 300 may include a half-bridge 302 connected to the DC IN1 port and to the mid-point 122. Shorting switches $Q_{S1}$ and $Q_{S2}$ may be provided to short the gates of high FETs $Q_{H1}$, $Q_{H2}$, and $Q_{H3}$. The control signal 132 can be used to turn ON both the $Q_{S1}$ and $Q_{S2}$ shorting switches, in the manner discussed above, in order to drive all three input ports with a regulated output voltage in accordance with the present disclosure.

Figure 4:
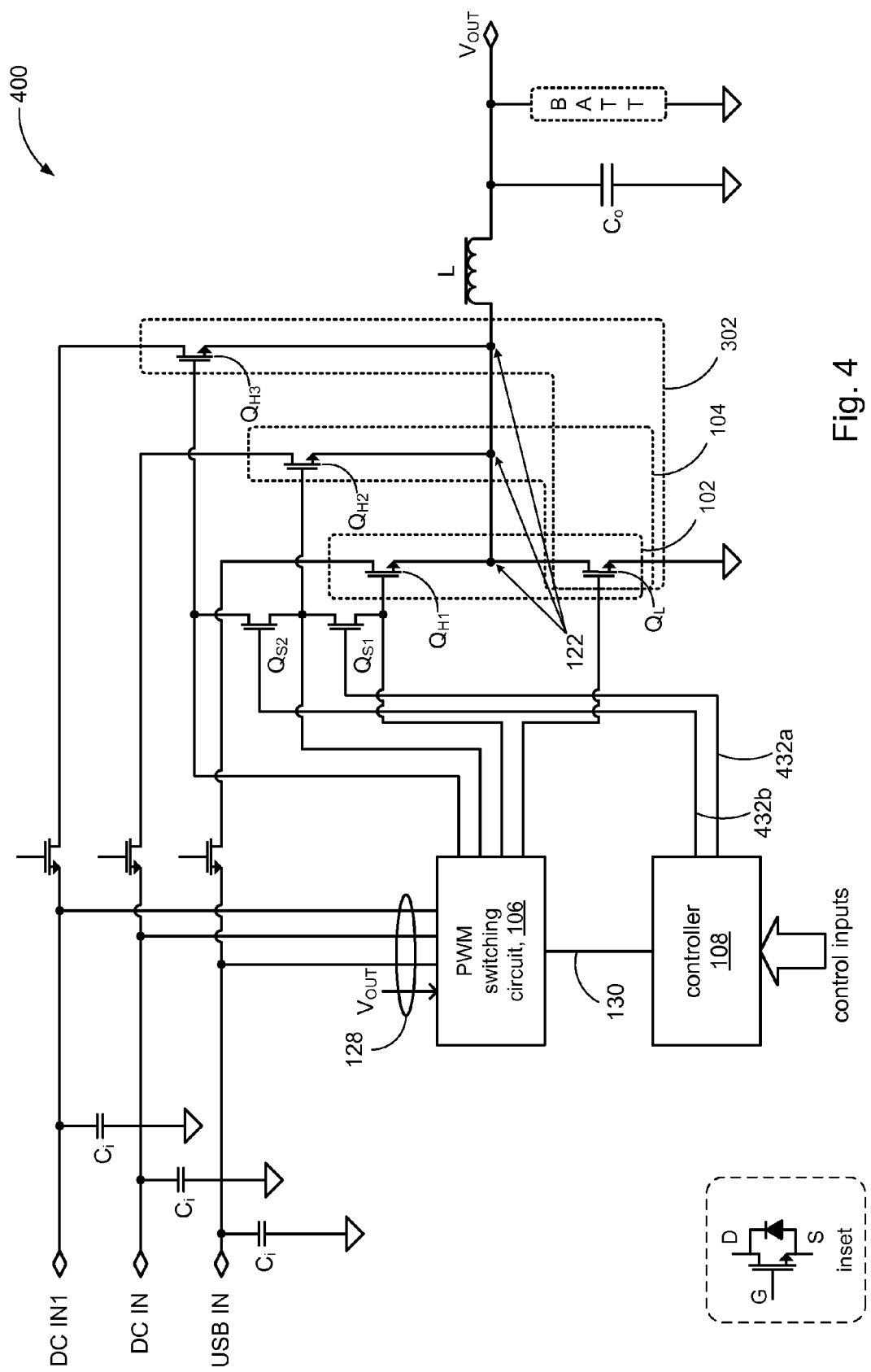
FIG. 4 illustrates an alternative embodiment of FIG. 3.

In some embodiments, additional circuitry and/or controls may be provided so that reverse boost mode operation is enabled on pairs of input ports. Referring to FIG. 4, for example, in an embodiment, the controller 108 may provide control signals 432a and 432b to specify the input ports that reverse boost mode operation is enabled for. For example, if both control signals 432a and 432b are asserted, then reverse boost mode is enabled for all three input ports. If only control signal 432a is asserted, then reverse boost mode is enabled for input ports USB IN and DC IN, but not DC IN1. If only control signal 432b is asserted, then reverse boost mode is enabled for input ports DC IN and DC IN1, but not USB IN.

Figure 5:
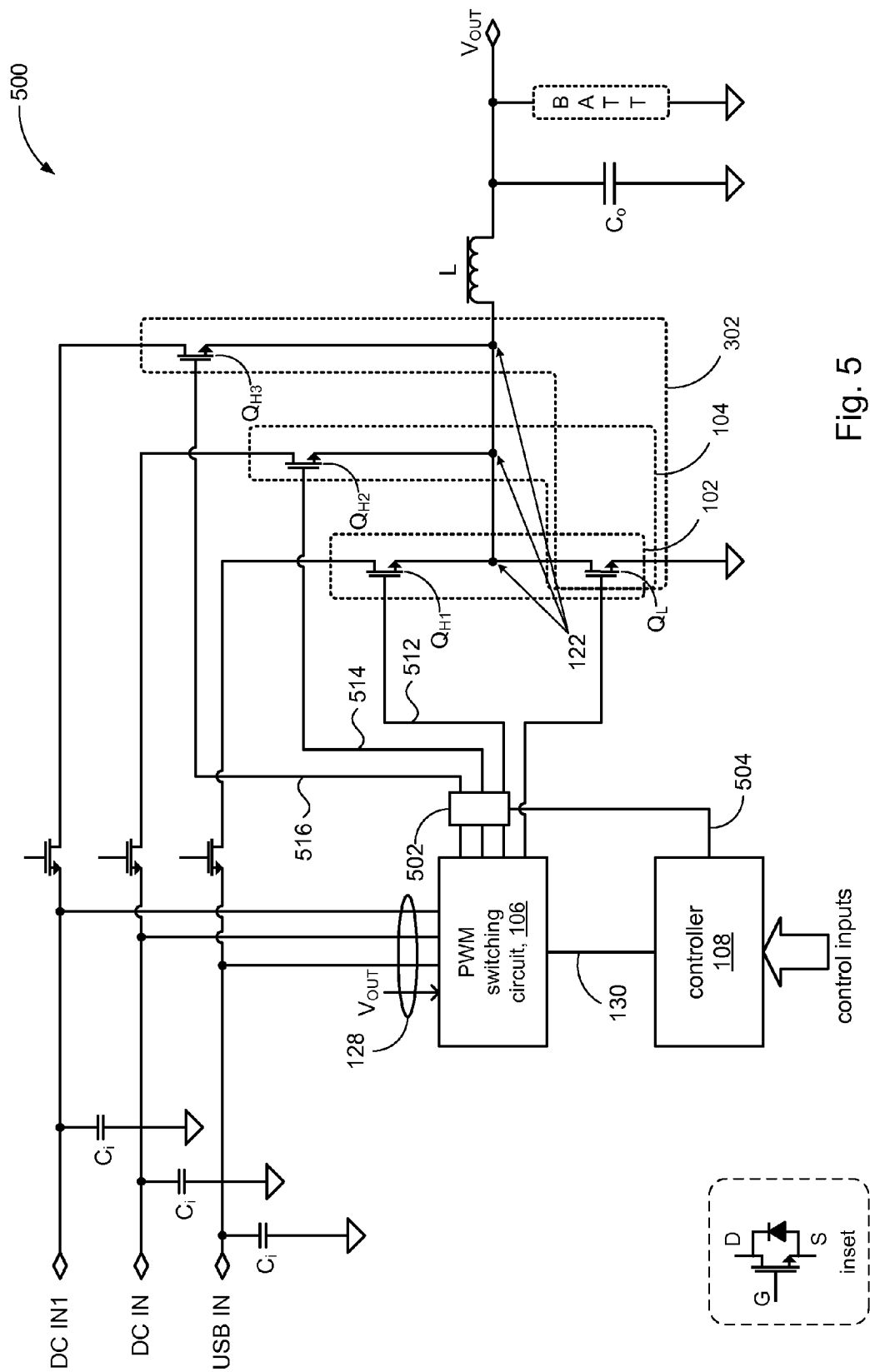
FIG. 5 illustrates an additional alternative embodiment of FIG. 3.

Referring to FIG. 5, in some embodiments, the shorting switches QS1 and QS2 may be replaced with a shorting matrix 502. The shorting matrix 502 may comprise a an array of switches that can be configured to short together any two of the high side drive signal lines 512, 514, 516, or all three of the lines. For example, lines 512 and 514 may be shorted together so that a regulated output voltage can be generated at the USB IN and DC IN ports, lines 512 and 516 may be shorted together so that a regulated output voltage can be generated at the USB IN and DC IN1 ports, and so on. The controller 108 may generate suitable control signals 504 to control the shorting matrix 502.

Advantages and Technical Effect

Advantages of switching regulators in accordance with the present disclosure over prior art regulators include significant reductions in chip real estate and chip cost. Providing additional power rails at the input side of a prior art boost regulator operating in reverse boost mode typically requires "tapping" off of one or more of the input ports with multiple switches that use power FETs. Power FETs are typically physically large devices as compared to switching FETs and thus consume significant additional chip real estate. The switches need to be isolated from each other and from the input port being tapped. The additional isolation circuits increase the overall complexity of the design of a conventional regulator.

By comparison, switching regulators in accordance with the present disclosure (e.g., buck-boost regulator 100), can avoid the costly additional circuitry by "re-using" existing power FETs in the manner explained above. By adding only a small switching FET such as the shorting switch $Q_S$ (FIG. 1) and some additional control logic in the controller 108, an additional power rail for reverse boost mode can be realized with no significant increase in the size and complexity of the chip and virtually no increase in manufacturing cost.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A circuit comprising:
   a first half-bridge circuit having an input, a high-side gate drive input, a low-side gate drive input, and an output;
   at least a second half-bridge circuit having an input, a high-side gate drive input, a low-side gate drive input, and an output;
   a shorting switch connected between the high-side gate drive input of the first half-bridge circuit and the high-side gate drive input of the second half-bridge circuit, and having an ON state wherein the high-side gate drive inputs of the first half-bridge circuit and the second half-bridge circuit are electrically connected and an OFF state wherein the high-side gate drive inputs of the first half-bridge circuit and the second half-bridge circuit are not electrically connected;
   an inductor having one end connected to the output of each half-bridge circuit and another end connected to an output of the circuit; and
   a switching signal generator connected to the high-side gate drive input and low-side gate drive input of each half-bridge circuit.

2. The circuit of claim 1 further comprising a controller connected to the shorting switch and having a switch control signal to control the ON-OFF state of the shorting switch.

3. The circuit of claim 1 wherein the switching signal generator generates first switching signals for buck mode operation and the switching signal generator generates second switching signals for boost mode operation, wherein the shorting switch is OFF during buck mode operation and the shorting switch is selectively ON during boost mode operation.

4. The circuit of claim 3 wherein for buck mode operation, a voltage level at the input of one of the half-bridge circuits is bucked to generate a regulated voltage level at the output of the circuit.

5. The circuit of claim 3 wherein for boost mode operation, a voltage level at the output of the circuit is boosted to generate a regulated voltage level at both inputs of the first and second half-bridge circuits.

6. The circuit of claim 3 wherein for boost mode operation, the switching signal generator uses either a voltage level at the input of the first half-bridge circuit or a voltage level at the input of the second half-bridge circuit as feedback.

7. The circuit of claim 1 wherein each half-bridge circuit comprises a high side switch connected to a low side switch.

8. The circuit of claim 7 wherein each high side switch of each half-bridge circuit is connected to the same low side switch.

9. The circuit of claim 1 further comprising a capacitor connected to the output of the circuit.

10. The circuit of claim 1 wherein the circuit is a buck-boost switching regulator.

11. A circuit comprising:
a first input port and a second input port;
an output port;
a first half-bridge circuit and a second half-bridge circuit connected respectively to the first input port and the second input port, each half-bridge circuit comprising a high side driver input and a low side driver input, the first and second half-bridge circuits connected at a common output;
a pulse width modulated (PWM) switching circuit configured to provide drive signals to the high side and low side driver inputs of the first and second half-bridge circuits to operate the circuit in a forward buck mode or in a reverse boost mode; and
an inductor connected between the common output of the first and second half-bridges and the output port,
the PWM switching circuit configured to generate first drive signals for forward buck mode operation that are provided to the high side and low side driver inputs of one of the half-bridge circuits, wherein a first voltage level at the input port of said one of the half-bridge circuits appears at the output port as a bucked voltage level,
the PWM switching circuit further configured to generate second drive signals for reverse boost mode operation, wherein the first and second half-bridge circuits are configured to receive the second drive signals at their respective high side and low side driver inputs at substantially at the same time, wherein a second voltage level provided at the output port is boosted to produce a boosted voltage level at both the first input port and the second input port.

12. The circuit of claim 11 further comprising a shorting switch connected between the first and second half-bridge circuits, and is operable to selectively electrically connect and disconnect the high side driver input of the first half-bridge circuit and the high side driver input of the second half-bridge circuit, wherein during the forward buck mode operation, the shorting switch is in an OFF state and during the reverse boost mode operation, the shorting switch is selectively in an ON state.

13. The circuit of claim 11 further comprising a controller to control operation of the PWM switching circuit and to control whether the second drive signals drive only one of the half-bridge circuits or both of the half-bridge circuits.

14. The circuit of claim 11 wherein the PWM switching circuit is further configured to select a voltage level at one of input ports as feedback and generate an error signal during reverse boost mode operation from the selected feedback.

15. The circuit of claim 11 further comprising a third input port and a third half-bridge circuit connected to the third input port and comprising a high side driver input and a low side driver input, wherein the first, second, and third half-bridge circuits are configured to receive the second drive signals at their respective high side and low side driver inputs at substantially at the same time, wherein the boosted voltage level appears at the first, second, and third input ports.

16. A switching regulator circuit comprising:
first and second input ports;
an output port;
first means for switching a voltage at the first input port or the output port in response to drive signals provided thereto to produce a regulated voltage level at the first input port or the output port;
second means for switching a voltage at the second input port or the output port in response to drive signals provided thereto to produce a regulated voltage level at the second input port or the output port; and
third means for selectively enabling drive signals to be provided to both the first and second means or to either the first means or the second means, wherein the third means can enable provisioning of drive signals to the first and second means at substantially the same time to generate a regulated voltage level at both the first and second input ports.

17. The circuit of claim 16 further comprising fourth means connected to the first and second means for generating drive signals.

18. The circuit of claim 17 wherein the fourth means is connected to the first and second input ports and the output port, wherein a voltage at one of the ports is used to regulate duty cycles of the drive signals.

19. The circuit of claim 16 wherein the third means enables the provisioning of drive signals to the first and second means at substantially the same time during reverse boost mode operation.

20. The circuit of claim 16 wherein the circuit is a buck-boost switching regulator.

* * * * *